US008374911B2

(12) United States Patent
Glachant et al.

(10) Patent No.: US 8,374,911 B2
(45) Date of Patent: Feb. 12, 2013

(54) VEHICLE USAGE-BASED TOLLING PRIVACY PROTECTION ARCHITECTURE

(75) Inventors: Mathieu Joseph Robert Glachant, Boonton, NJ (US); Rick Allen Hamilton, II, Charlottesville, VA (US); Naveen Lamba, Haymarket, VA (US); Gary Paul Noble, Worcestershire (GB); Brian Marshall O'Connell, Research Triangle Park, NC (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 12/572,001

(22) Filed: Oct. 1, 2009

(65) Prior Publication Data

US 2011/0082797 A1    Apr. 7, 2011

(51) Int. Cl.
*G07B 15/00* (2011.01)
*G06Q 20/00* (2006.01)

(52) U.S. Cl. .......................................... 705/13; 705/64
(58) Field of Classification Search ............... 705/13, 705/64; 340/928; 701/33
See application file for complete search history.

(56) References Cited

U.S. PATENT DOCUMENTS

| | | | | |
|---|---|---|---|---|
| 6,661,352 | B2 * | 12/2003 | Tiernay et al. | 340/928 |
| 2003/0233321 | A1 * | 12/2003 | Scolini et al. | 705/40 |
| 2009/0228350 | A1 * | 9/2009 | Robinson et al. | 705/13 |
| 2010/0250053 | A1 * | 9/2010 | Grill et al. | 701/33 |

OTHER PUBLICATIONS

U.S. Appl. No. 12/336,754, filed Dec. 17, 2008, Hamilton et al.
U.S. Appl. No. 12/336,587, filed Dec. 17, 2008, Hamilton et al.
U.S. Appl. No. 12/341,009, filed Dec. 22, 2008, Hamilton et al.
U.S. Appl. No. 12/336,820, filed Dec. 17, 2008, Ashby et al.
U.S. Appl. No. 12/341,054, filed Dec. 22, 2008, Hamilton et al.
U.S. Appl. No. 12/336,742, filed Dec. 17, 2008, Hamilton et al.
U.S. Appl. No. 12/341,087, filed Dec. 22, 2008, Ashby et al.

\* cited by examiner

*Primary Examiner* — Charles C Agwumezie
(74) *Attorney, Agent, or Firm* — Yee & Associates, P.C.; John R. Pivnichny

(57) ABSTRACT

A client-side on-board computing device is partitioned into a trusted computing module, and a private computing platform. When a metric report is required, the private computing platform retrieves an original data file and transfers the original data file to the trusted computing module. The original data file includes a global positioning system coordinate stream and time information. Communication between the private computing platform and the trusted computing module is via an unencrypted serial link. The private computing platform applies at least one billing algorithm to the original data file to determine a billing charge. The private computer platform signs and hashes the billing charge using a private key of a public-private endorsement key pair to create a signed metric report. The private computer platform forwards the signed metric report to the trusted computing module via the unencrypted serial link. The trusted computing module then forwards the signed metric report by the trusted computing module to a billing authority.

21 Claims, 10 Drawing Sheets

VEHICLE USAGE-BASED TOLLING PRIVACY PROTECTION ARCHITECTURE

BACKGROUND

1. Field

The present disclosure relates generally to computer implemented methods, computer storage media, and data processing systems. More specifically, the present disclosure relates to computer implemented methods, computer storage media, and data processing systems for a vehicle usage-based tolling privacy protection architecture.

2. Description of the Related Art

Many local and national governments have congestion issues on their road networks, as well as increasing demand for renewed action on emissions control. Many governments are now considering road use charging solutions as a means to both measure a variety of cost of use metrics and to reflect these costs back to their originators in an effort to impact behavior positively. Road use charging solutions usually determine the cost of use metrics and the associated fees on the basis of some combination of three forms of information collected with varying levels of coverage and granularity: distance, location, and time-of-day.

Solutions have been deployed that implement the collection of this information and the processing of this information into metrics and fees using a plurality of methods. These methods may require adding hardware to vehicles, centralized processing of cast amounts of positional information, and these methods may also require the installation of large and expensive infrastructures of detection equipment within the road network itself.

Design tradeoffs have been made largely on the basis of cost. As a result, applications to small geographical areas with high vehicle densities tend to favor road side infrastructure and centralized processing. Applications to large geographical areas with lower vehicle densities tend to favor on-board equipment and decentralized processing.

Trusted computing (TC) is a technology developed and promoted by the Trusted Computing Group. The term is taken from the field of trusted systems and has a specialized meaning. With Trusted Computing, the computer will consistently behave in specific ways, and those behaviors will be enforced by hardware and software. Enforcing this trusted behavior is achieved by loading the hardware with a unique ID and a unique master key and denying even the owner of computer knowledge and control of their own master key.

Therefore, it would be advantageous to have a method and apparatus which takes into account one or more of the issues discussed above, as well as possibly other issues.

SUMMARY

According to one embodiment, a computer implemented method, a data processing system, and a tangible computer storage medium having computer usable program code encoded thereon are provided for determining road usage charges using a client-side on-board computing device. The client-side on-board computing device is partitioned into a trusted computing module, and a private computing platform. When a metric report is required, the private computing platform retrieves an original data file and transfers the original data file to the trusted computing module. The original data file includes a global positioning system coordinate stream and time information. Communication between the private computing platform and the trusted computing module is via an unencrypted serial link. The private computing platform applies to at least one billing algorithm to the original data file to determine a billing charge. The private computer platform signs and hashes the billing charge using a private key of a public-private endorsement key pair to create a signed metric report. The private computer platform forwards the signed metric report to the trusted computing module via the unencrypted serial link. The trusted computing module then forwards the signed metric report by the trusted computing module to a billing authority.

DETAILED DESCRIPTION

Figure 1:
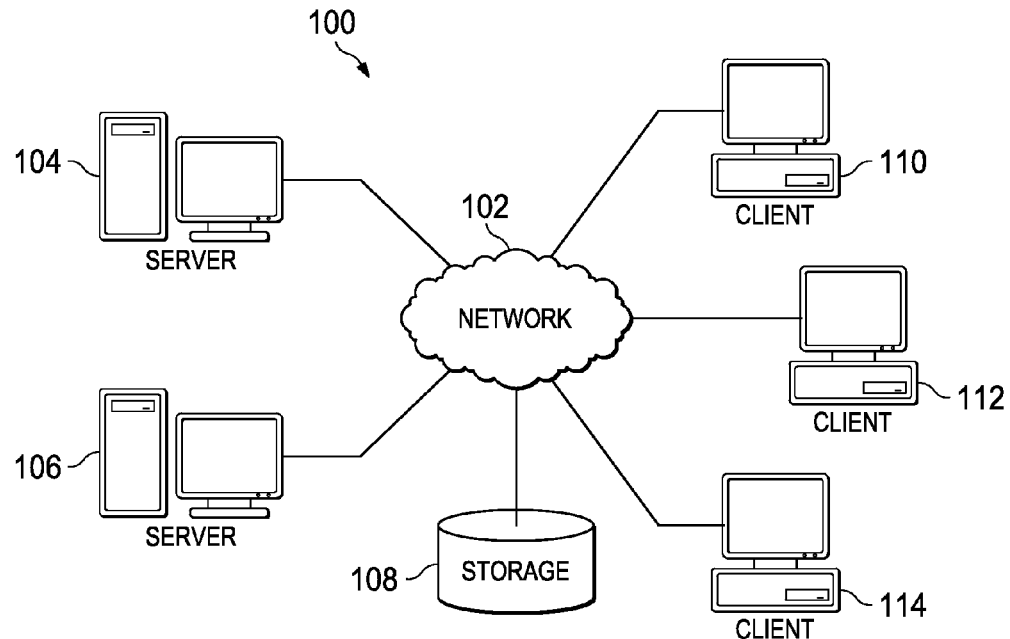
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to, wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus, provide processes for implementing the functions/acts specified in the flowchart and/or block diagram block or blocks.

Figure 2:
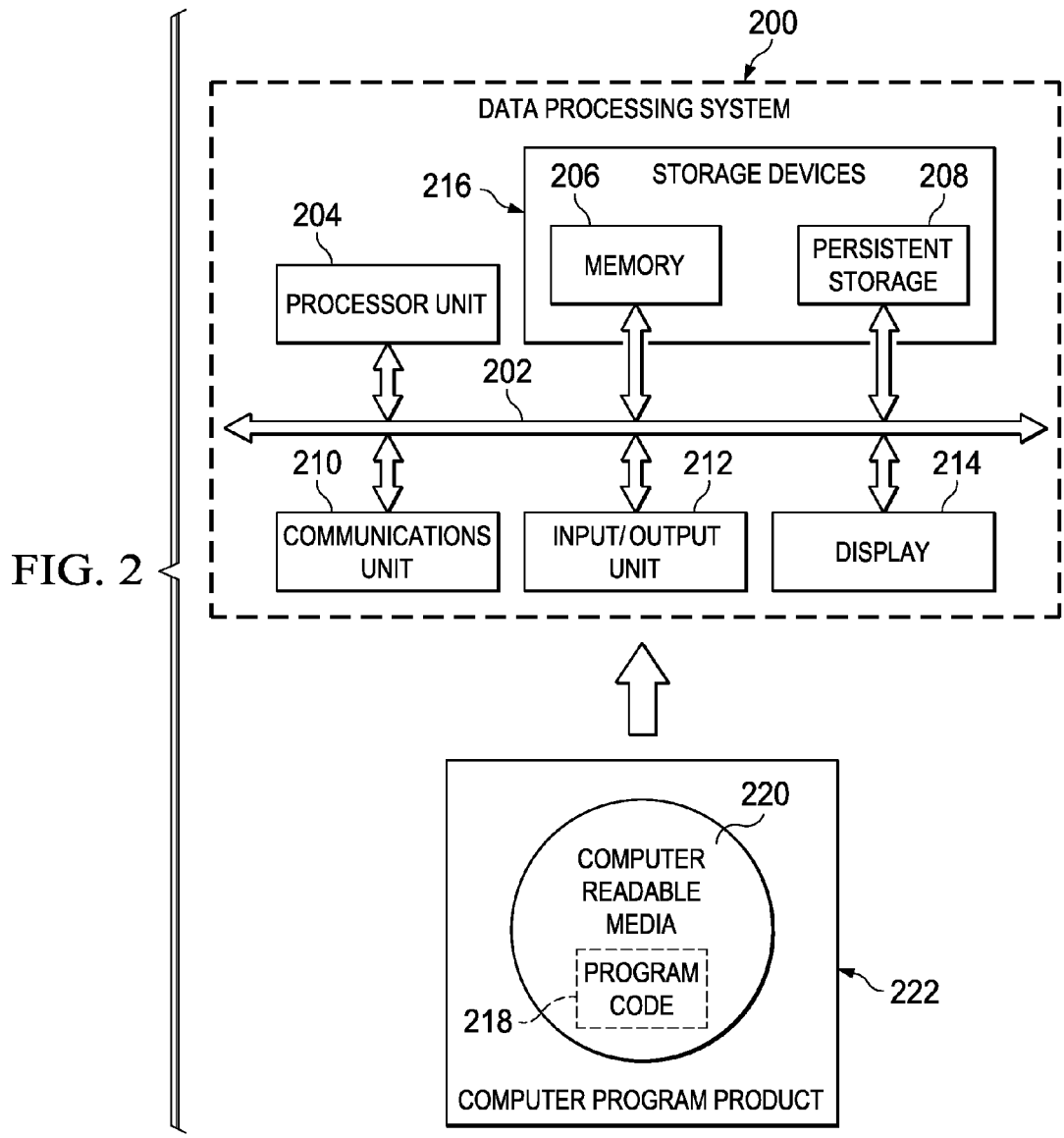
FIG. 2 is a block diagram of a data processing system in which illustrative embodiments may be implemented.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors, or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communication links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code, that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communication links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
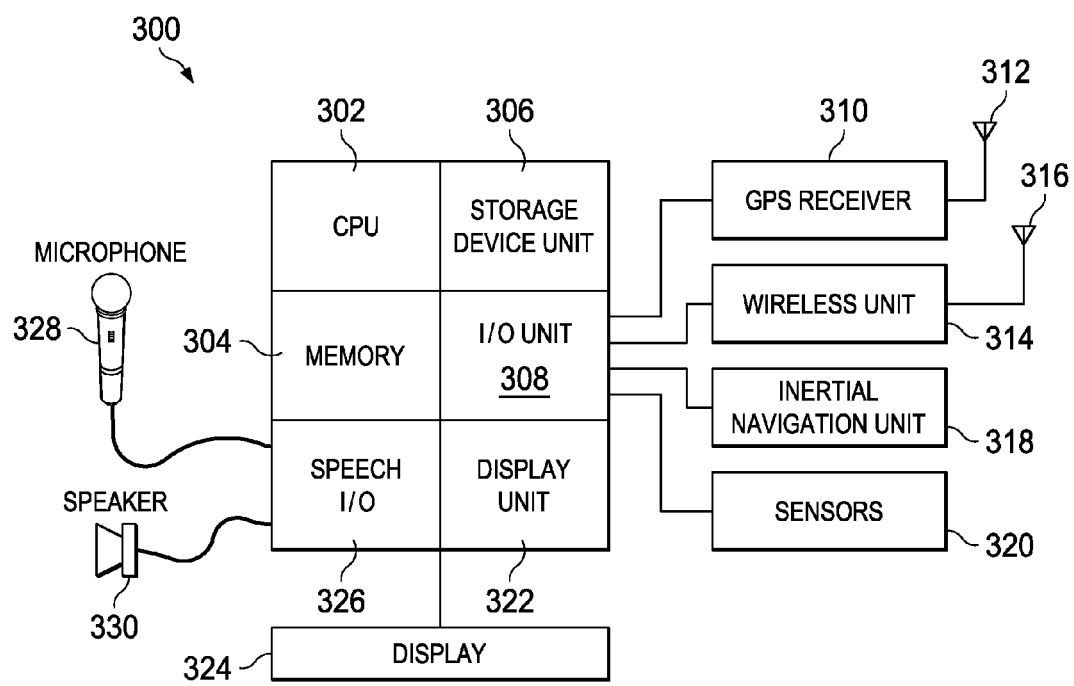
FIG. 3 is a block diagram of an automotive computing platform in accordance with an illustrative embodiment.

Turning next to FIG. 3, a block diagram of an automotive computing platform is depicted in accordance with an illustrative embodiment. Computing platform 300 can be one of clients 110, 112, and 114 of FIG. 1. Computing platform 300 is located within a vehicle, such as an automobile or truck. Computing platform 300 includes CPU 302, which may be an embedded processor or processor such as a Pentium® processor from Intel Corporation. "Pentium" is a trademark of Intel Corporation. Computing platform 300 also includes memory 304, which may take the form of random access memory (RAM) and/or read only memory (ROM).

Computing platform 300 also contains a storage device unit 306. Storage device unit 306 may contain one or more storage devices, such as, for example, a hard disk drive, a flash memory, a DVD drive, or a floppy disk. Computing platform 300 also includes an input/output (I/O) unit 308, which provides connections to various I/O devices. In this example, global positioning system (GPS) receiver 310 is included within automotive computing platform 300 and receives signals through antenna 312. Wireless unit 314 provides for two-way communications between computing platform 300 and another data processing system, such as server 104 in FIG. 1. Communications are provided through antenna 316. In addition, inertial navigation unit 318 is connected to I/O unit 308. Inertial navigation unit 318 is employed for navigation when GPS receiver 310 is unable to receive a usable signal or is inoperable.

A multitude of different sensors 320 also are connected to I/O unit 308. These sensors may include sensors that detect speed, unusually high acceleration forces, airbag deployment, and extensive speed up and slow down cycles, dropping out of cruise control, brake use, anti-lock brake occurrences, traction control use, windshield wiper use, turning on or off of lights for the automobile, and outside light levels. In addition, sensors 320 may include sensors for detecting steering wheel movement, temperature, the state of door locks, and the state of windows. In other words, almost any condition or parameter about or around an automobile may be detected through the use of sensors 320.

Computing platform 300 also includes display unit 322, which is connected to display 324. In the depicted example, this display is a touch screen display. Alternatively, or in addition to a touch screen display, display 324 also may employ a heads-up display projected onto the windshield of the automobile. Computing platform 300 also includes microphone 328 and speaker 330 to provide a driver with an ability to enter commands and receive responses through speech I/O 326 without having to divert the driver's attention away from the road, or without the driver having to remove the driver's hands from the steering wheel.

Figure 4:
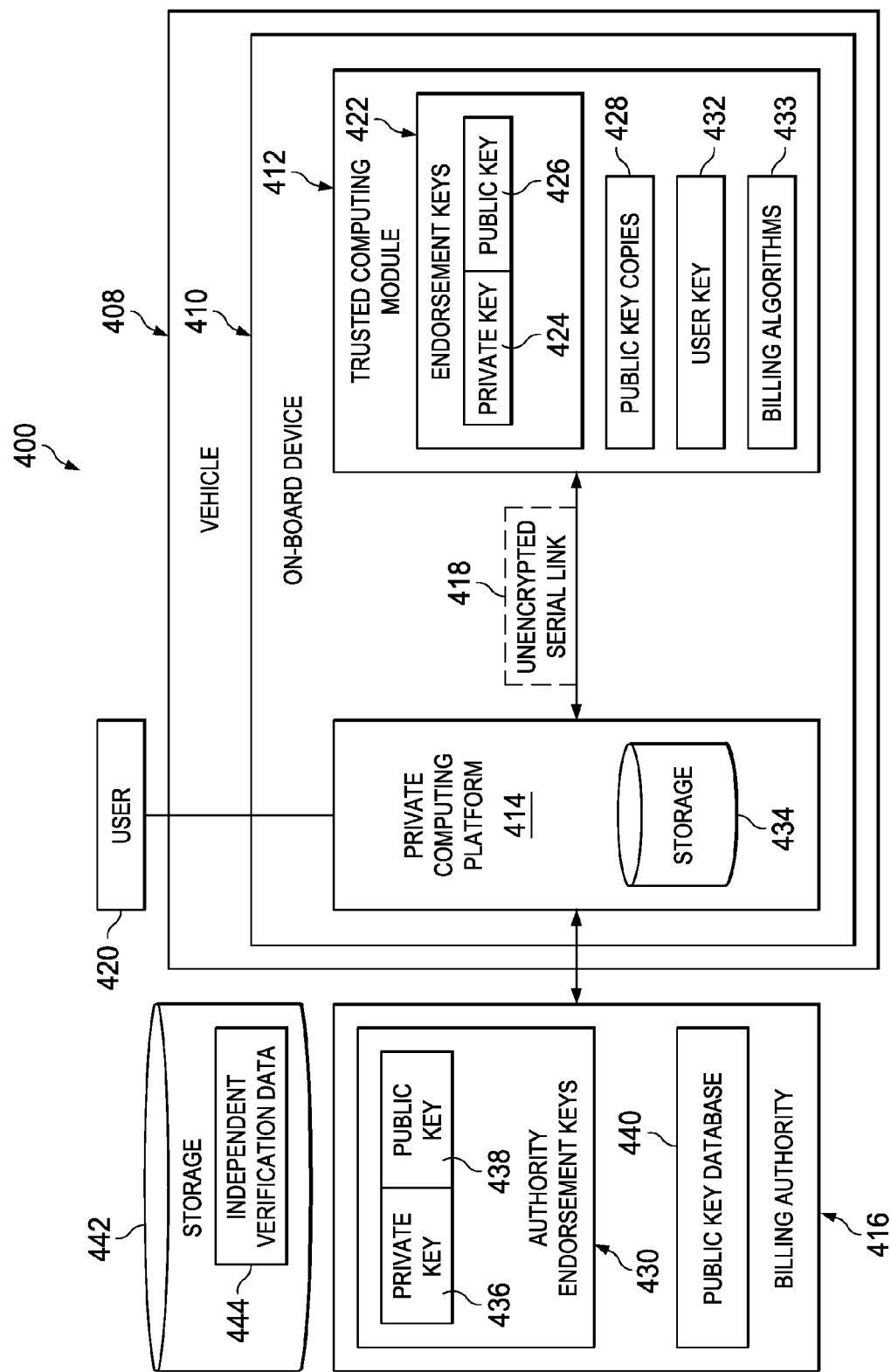
FIG. 4 is a dataflow diagram of a vehicle usage-based billing environment according to an illustrative embodiment.

Referring now to FIG. 4, a dataflow diagram of a vehicle usage-based billing environment is shown according to an illustrative embodiment. In this example, billing environment 400 includes billing authority 416 and vehicle 408. Vehicle 408 may be, for example, without limitation, an automobile, a bus, a truck, a motorcycle, or some other suitable vehicle. In these examples, billing environment 400 is a vehicle usage-based billing environment that provides privacy to a user of vehicle 408.

On-board device 410 in vehicle 408 is an automotive computing platform, such as computing platform 300 of FIG. 3 in these illustrative examples. On-board device 410 is capable of receiving, or determining locations based on global positioning system coordinate information.

On-board device 410 is partitioned into trusted computing module 412 and private computing platform 414. Trusted computing module 412 is a client side, on-board partition of hardware in on-board device 410. In these illustrative examples, trusted computing module 412 acts as a proxy for billing authority 416. Trusted computing module 412 performs metric calculations, file authentication and audits.

Trusted computing module 412 can sign and hash files. Trusted computing module 412 applies metric calculation algorithms to data provided by private computing platform 414 and compares any timestamps. In these illustrative examples, trusted computing module 412 communicates only with private computing platform 414. All communications with private computing platform 414 are unencrypted via unencrypted serial link 418.

Private computing platform 414 is a client side, on-board partition of on-board device 410 that acts as a proxy for user 420. User 420 has direct physical access to the private computing platform 414. In one illustrative embodiment, user 420 has the choice of several vendors and designs to verify that private computing platform 414 is behaving as advertised.

Private computing platform 414 performs data collection, file storage, and external communications. Unlike trusted computing module 412, private computing platform 414 can communicate with the outside world, including billing authority 416. Private computing platform 414 collects and stores all the information trusted computing module 412 needs to determine the metrics. Private computing platform 414 formats those metrics into usable unprocessed original data files for processing by the trusted computing module 412.

Private computing platform 414 stores files it receives from trusted computing module 412 without altering the contents of the received files. Any such alteration will be detectable by trusted computing module 412 or by billing authority 416.

Billing authority 416 is a data processing system, such as one of server 104 and server 106 of FIG. 1. Billing authority 416 is vested with the powers and responsibilities to manage the road use charging solution secured by the illustrative embodiments. Billing authority 416 may have additional powers and responsibilities beyond managing the road use charging solution.

Trusted computing module 412 contains endorsement key 422. Endorsement keys 422 is a unique public-private key pair generated at manufacture and cannot be changed. Private key 424 of the unique public-private key pair never leaves the trusted computing module 412. Private key 424 is used to hash and sign files. Public key 426 is distributed to other devices, and can be used by anyone in possession of it to verify such signatures and hashes generated by private key 424. Billing authority 416 checks metric reports purported to be from trusted computing module 412 and utilizes public key 426 to verify such metric reports. Similarly, trusted computing module 412 utilizes public key 426 when checking the integrity of its hardware or software during a boot process.

Trusted computing module 412 also contains public key copies 428. Public key copies 428 are copies of public key 438 of authority endorsement keys 430 corresponding to a public-private key pair on billing authority 416. Public key copies 428 allows trusted computing module 412 to verify that certain files received from private computing platform 414 originated from billing authority 416, and that those files have not been modified from the condition in which they left billing authority 416.

In one illustrative embodiment, public key copies 428 comprises a hierarchical set of public key copies. Keys higher in the hierarchy will be able to revoke and replace keys lower in the hierarchy. A software update may change a public key from the billing authority 416 only if the update is signed with a key higher in the hierarchy than the non-updated software.

In one illustrative embodiment, trusted computing module 412 also stores user key 432. User key 432 allows user 420 to encrypt audit files before those files are passed to private computing platform 414, or a third-party storage facility, for storage. User key 432 is a public-private key pair generated by user 420. User key 432 allows user 420 to decrypt those audit files after retrieval.

User key 432 is given to trusted computing module 412 via the private computing platform 414. Transmission of user key 432 to trusted computing module 412 is protected from eavesdropping by encrypting user key 432 with public key 426.

If private computing platform 414 is not believed to be malicious, generation of user key 432 can be performed automatically with no involvement from user 420. That is, generation of user key 432 can be performed automatically when private computing platform 414 is not believed to store the user key 432 and the only objective is to protect stored data against attacks against private computing platform 414 after user key 432 is forwarded to trusted computing module 412. To fully protect against the possibility that the private computing platform 414 is malicious, either by design or accident, it will be necessary for user 420 to create user key 432. User 420 can then encrypt user key 432 with public key 426, and provide the result to private computing platform 414. Should there be a legal requirement for the data which will be encrypted with the user key to be decryptable at a later time, various trusted third-party key repositories could be used to store copies of the public key of user key 432.

Trusted computing module 412 also contains billing algorithms 433. Billing algorithms 433 is a hardware or software based logic that transforms global positioning system location information as well as time-based data received from private computing platform 414 into billing charges. The billing charges are then hashed and signed with private key 424. The billing charges are then sent to private computing platform 414 for eventual communication to billing authority 416.

Private computing platform 414 can access storage 434. Storage 434 stores files that private computing platform 414 receives from the trusted computing module 412. Files received from the trusted computing module 412 are stored without altering the file's contents. Attempted alteration will be detectable by trusted computing module 412 or by the billing authority 416 should the file be called for, and render the file unusable.

Billing authority 416 contains authority endorsement key 430. Authority endorsement keys 430 is a unique public-private key pair. Private key 436 of the unique public-private key pair never leaves the trusted computing module 412. Private key 436 is used to hash and sign files. Public key 438 is distributed to other devices, such as trusted computing module 412, and can be used by anyone in possession of it to verify such signatures and hashes generated by private key 436. Public key copies 428 is a copy of public key 438 that is locally stored on trusted computing module 412.

In one illustrative embodiment, authority endorsement key 430 comprises a hierarchical set of authority endorsement keys. Keys higher in the hierarchy will be able to revoke and replace keys lower in the hierarchy.

Billing authority 416 contains public key database 440. Public key database 440 contains copies of public keys from various trusted computing modules, such as public key 426. Maintaining public key database 440 allows billing authority 416 to verify that certain files received from private computing platform 414 originated from trusted computing module 412, and that those files have not been modified from the condition in which they trusted computing module 412.

Billing authority 416 can access storage 442. Storage 442 stores independent verification data 444. Independent verification data 444 is location and time information on the whereabouts of on-board device 410 or user 420, that are not received from on-board device 410. Independent verification data 444 can be received from, for example, but not limited to, radio-frequency identification of on-board device 410 or user 420 at a predetermined location, such as, for example, a dedicated short-range communications polling station.

The illustration of billing environment 400 in FIG. 4 is not meant to imply physical or architectural limitations to the manner in which different advantageous embodiments may be implemented. Other components in addition to, and/or in place of, the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
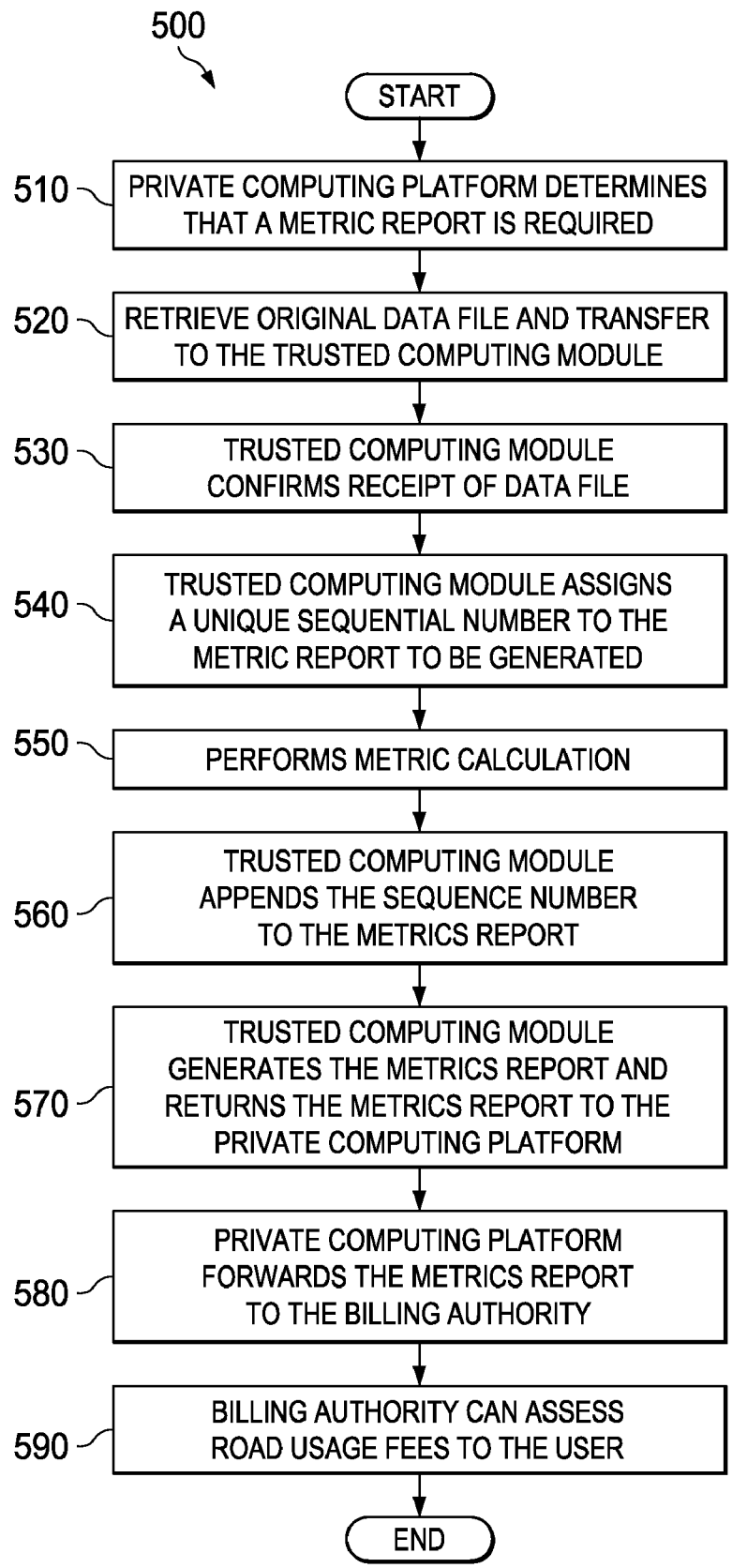
FIG. 5 is a flowchart for a vehicle usage-based tolling privacy protection architecture according to an illustrative embodiment.

Referring now to FIG. 5, a flowchart for a vehicle usage-based tolling privacy protection architecture is shown according to an illustrative embodiment. Process 500 is a process executing on the various hardware and software components of the vehicle usage-based tolling privacy protection architecture of FIG. 4.

Process 500 begins when a private computing platform determines that a metric report is required (step 510). Determination that a metric report is required can be based on, for example, but not limited to, time, buffer capacity of the trusted computing module, distance driven since the last metric report was generated, and requests from the billing authority.

Responsive to determining that a metric report is required, the private computing platform retrieves an original data file, and transfers that original data file to the trusted computing module (step 520). The data file can be retrieved from, for example, a storage, such as storage 434 of FIG. 4. The data file is transferred from the private computing platform to the trusted computing module via an unencrypted serial link, such as unencrypted serial link 418 of FIG. 4. The trusted computing module then confirms receipt of the data file (step 530).

Responsive to receiving the data file, the trusted computing module assigns a unique sequential number to the metric report to be generated (step 540), and performs the metric calculations (step 550). The metric calculations are performed by billing algorithms contained within the trusted computing module, such as billing algorithms 433 of FIG. 4. The billing algorithms can be a hardware or software based logic that transforms global positioning system location information as well as time based data received from private computing platform into billing charges.

The trusted computing module appends the sequence number to the metrics report (step 560). The trusted computing module generates the metrics report and returns the metrics report to the private computing platform (step 570). The metrics report is a receipt for road usage, as calculated, according to the billing algorithms stored on the trusted computing module. The metrics report is hashed and signed with private key of the trusted computing module.

Responsive to receiving the metrics report from the trusted computing module, the private computing platform forwards the metrics report to the billing authority (step 580). The private computing platform makes no changes to the metrics report. Based on the received metrics report, the billing authority can assess road usage fees to the user (step 590).

Figure 6:
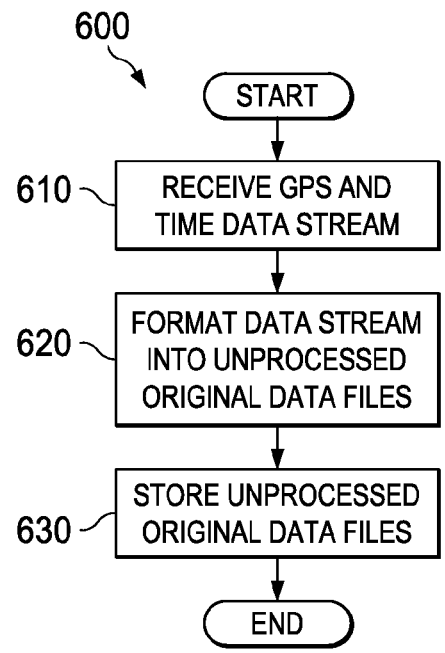
FIG. 6 is a flowchart of a process for collecting unprocessed data according to an illustrative embodiment.

Referring now to FIG. 6, a flowchart of a process for collecting unprocessed data is shown according to an illustrative embodiment. Process 600 is a software, hardware, or firmware process executing on a client side of an on-board computing device, such as private computing platform 414 of FIG. 4.

Process 600 begins by receiving a global positioning system coordinate stream and time information (step 610). The global positioning system coordinate stream and time information can be sent to the private computing platform from a global positioning system capable device, such as on-board device 410 of FIG. 4.

Process 600 then formats the global positioning system coordinate stream and time information into unprocessed original data files (step 620). The unprocessed original data files are in a form that is suitable for processing by a proxy for a billing authority, such as trusted computing module 412 of FIG. 4.

Responsive to formatting the global positioning system coordinate stream and time information into unprocessed original data files, process 600 stores unprocessed original data files (step 630), with the process terminating thereafter. The unprocessed original data files can be retrieved later for processing by the trusted computing module into a metric report. The original data files can be stored in a storage device, such as storage 434 of FIG. 4. In one illustrative embodiment, a user key allows a user to encrypt unprocessed original data files before those files are passed to a third-party storage facility for storage. The user key is a public-private key pair. The user key further allows a user to decrypt those unprocessed original data files after retrieval.

Figure 7:
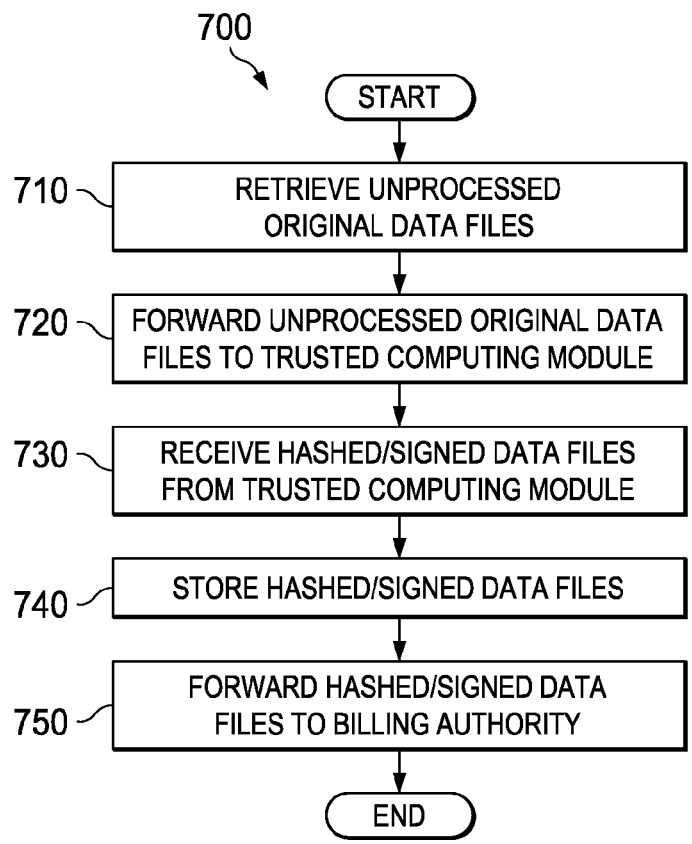
FIG. 7 is a flowchart of a process for generating metric reports according to an illustrative embodiment.

Referring now to FIG. 7, a flowchart of a process for generating metric reports is shown according to an illustrative embodiment. Process 700 is a software, hardware, or firmware process executing on a client side of an on-board computing device, such as private computing platform 414 of FIG. 4.

Process 700 begins by retrieving an unprocessed original data file (step 710). The unprocessed original data file can be retrieved from a storage device, such as storage 434 of FIG. 4). The unprocessed original data file can be retrieved directly from an incoming global positioning system coordinate stream and time information received by the private computing platform.

Responsive to retrieving the unprocessed original data file, process 700 forwards the unprocessed original data file to a trusted computing module for metric generation (step 720). The unprocessed original data file is forwarded to the trusted computing module via an unencrypted serial link, such as unencrypted serial link 418 of FIG. 4.

Once the trusted computing module has finished calculating, hashing and signing the generated metrics, the trusted computing module forwards the hashed and signed data files back to the private computing platform, where process 700 receives the hashed and signed data files (step 730). The data files are hashed and signed utilizing a public-private key pair, such that the integrity of the data files can be verified upon receipt at a billing authority in possession of a corresponding public key.

Responsive to receiving the hashed and signed data files, process 700 can store the hashed and signed data files (step 740). The hashed and signed data files can be stored in a storage device, such as storage 434 of FIG. 4. A user can later retrieve the hashed and signed data files for comparison to a final bill received from the billing authority.

Process 700 then forwards the hashed and signed data files to the billing authority (step 750), with the process terminating thereafter. The billing authority can utilize a public key copy to verify the integrity of the hashed and signed data files received from the public computing platform. The billing authority can then utilize the hashed and signed data files to generate a road usage bill for the user.

Figure 8:
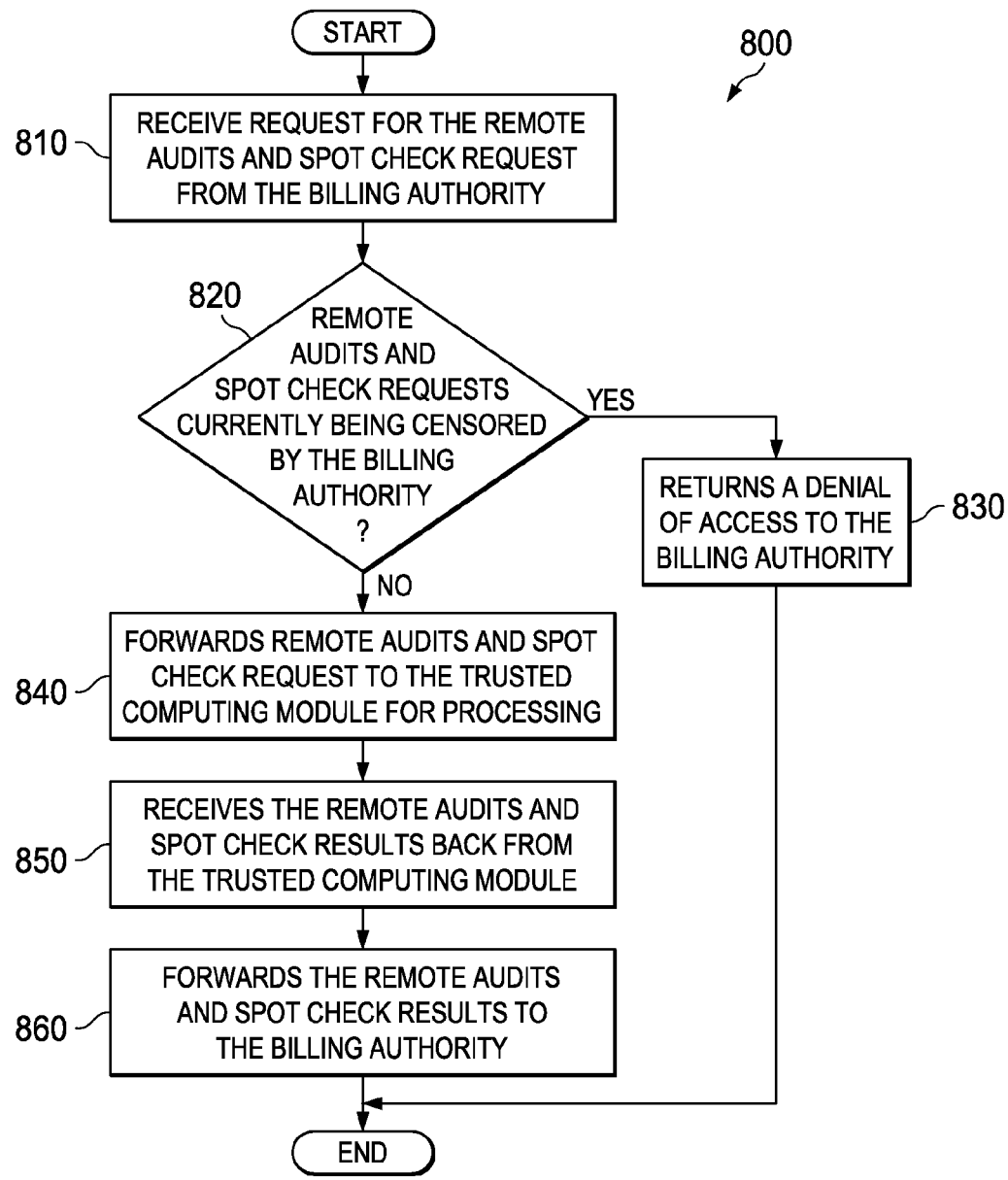
FIG. 8 is a flowchart of a process for responding to remote audits and spot check requests according to an illustrative embodiment.

Referring now to FIG. 8, a flowchart of a process for responding to remote audits and spot check requests is shown according to an illustrative embodiment. Process 800 is a software, hardware, or firmware process executing on a client side of an on-board computing device, such as private computing platform 414 of FIG. 4.

A remote audit is a known data file having a known result that is sent to the private computing platform to verify that the trusted computing platform has not been compromised. The billing authority is able to send a signed and hashed file to a trusted computing module with either a sample processed original data file signed by itself with a known metrics value or with a unique sequential identifier from a metrics report received from that trusted computing module. The billing authority will then expect to receive a metric report file signed and hashed by the trusted computing module containing the metrics calculated from the original data by the algorithms in the trusted computing module. In the case of a remote audit, the result received from the trusted computing module should match the known results. A discrepancy between the result received from the trusted computing module and the known results indicates a security breach, as either the data files or the algorithm on the trusted computing module has been compromised.

A spot check is a data file that is sent to the private computing platform to verify other location, or metric information previously received from the trusted computing module, or from an independent source. The billing authority is able to send a signed and hashed file to a trusted computing module with a data point as well as the unique sequential identifier from a metrics report, spanning a certain time, received from that trusted computing module. The billing authority will then expect to receive a spot check report file signed and hashed by the trusted computing module containing an indication on whether the trusted computing module is provided with the correct processed original data file. Furthermore, the spot check should contain an indication on whether the data point provided was consistent with the original data. If the data point is not consistent with the original data, then it is possible that the original data is compromised prior to being passed to the trusted computing module for processing. The billing authority time stamps all messages routed to the trusted computing module with a global positioning system time.

Process 800 begins by receiving a request for the remote audits and spot check requests from the billing authority (step 810). The remote audits and spot check requests are signed and hashed by the billing authority using a unique public-private key pair, such as authority endorsement key 430 of FIG. 4.

Responsive to receiving the request, process 800 identifies whether remote audits and spot check requests are currently being censored by the private computing platform (step 820). Under certain conditions, a user may optionally elect to block remote audits and spot check requests by the billing authority. If remote audits and spot check requests are currently being censored by the private computing platform ("yes" at step 820), process 800 returns a denial of access to the billing authority (step 830), with the process terminating thereafter. The billing authority may then choose to levy fines, or impose some other penalty for the blocked access.

Returning now to step 820, if remote audits and spot check requests are not currently being censored by the private computing platform ("no" at step 820), process 800 forwards the remote audits and spot check request to the trusted computing module for processing (step 840).

The remote audits and spot check requests are performed at the trusted computing platform. The trusted computing platform signs and hashes the results, and then forwards the remote audits and spot check results back to the private computing module. Process 800 then receives the remote audits and spot check results from the trusted computing module (step 850). Process 800 then forwards the remote audits and spot check results to the billing authority (step 860), with the process terminating thereafter.

Figure 9:
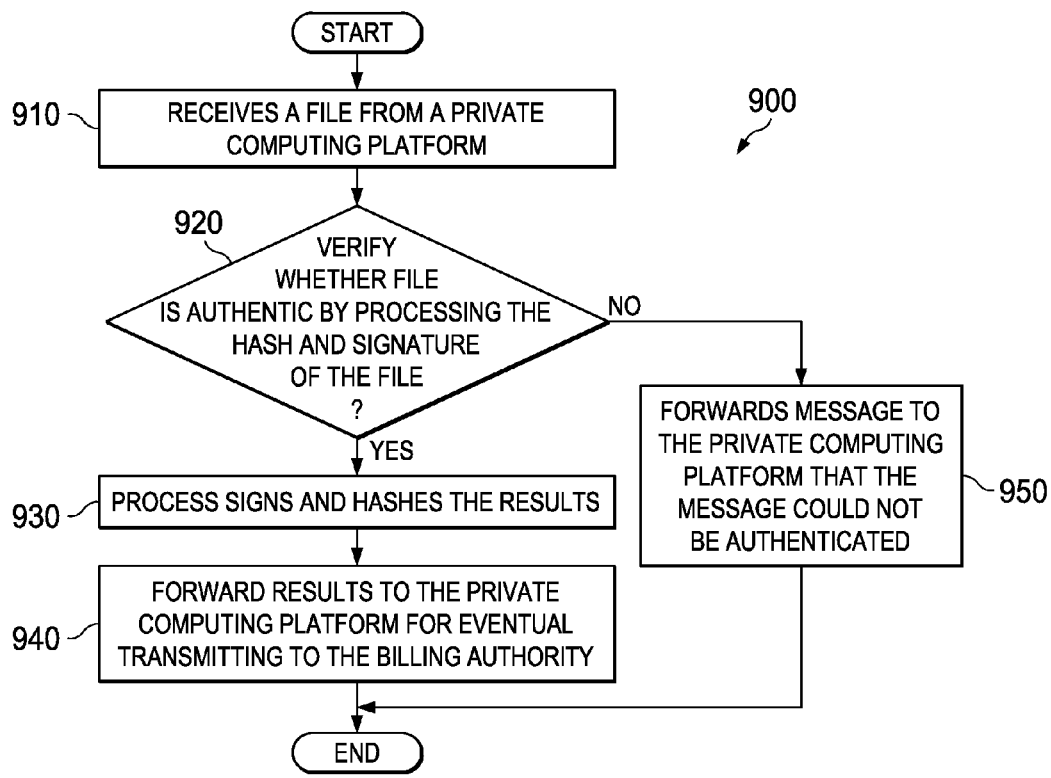
FIG. 9 is a flowchart of a process for verifying the authenticity of remotely received files according to an illustrative embodiment.

Referring now to FIG. 9, a flowchart of a process for verifying the authenticity of remotely received files is shown according to an illustrative embodiment. Process 900 is a software, hardware, or firmware process executing on a billing authority proxy side of an on-board computing device, such as trusted computing module 412 of FIG. 4. Remotely received files can include, for example, but not limited to, software updates, spot check requests, and remote audit requests.

Process 900 begins by receiving a file from the private computing platform (step 910). The file is passed from the private computing platform to process 900 via an unencrypted serial link, such as unencrypted serial link 418 of FIG. 4.

Responsive to receiving the file from the private computing platform, process 900 verifies whether the file is authentic by processing the hash and signature of the file (step 920). Process 900 can verify the file by utilizing a public key of a public-private key pair, such as public key copies 428 of FIG. 4. The public key is a copy of a public key of authority endorsement keys corresponding to a public-private key pair on the billing authority. The public key allows the trusted computing module to verify that the signed and hashed file received from the private computing platform originated from the billing authority, and that the file has not been modified from the condition in which it left the billing authority.

Responsive to determining that the file is authentic ("yes" at step 920), process 900 signs and hashes the results (step 930). Process 900 signs and hashes the results using its own endorsement key, such as endorsement key 422 of FIG. 4. The endorsement key is a unique public-private key pair generated at manufacture and which cannot be changed. The private key of the unique public-private key pair never leaves the trusted computing module. Process 900 uses the private key to hash and sign the results. The public key is distributed to the billing authority.

Responsive to signing and hashing the results, process 900 forwards the results to the private computing platform for eventual transmittal to the billing authority (step 940), with the process terminating thereafter.

Returning now to step 920, responsive to determining that the file is not authentic ("no" at step 920), process 900 forwards a message to the private computing platform that the message could not be authenticated (step 950), with the process terminating thereafter.

Figure 10:
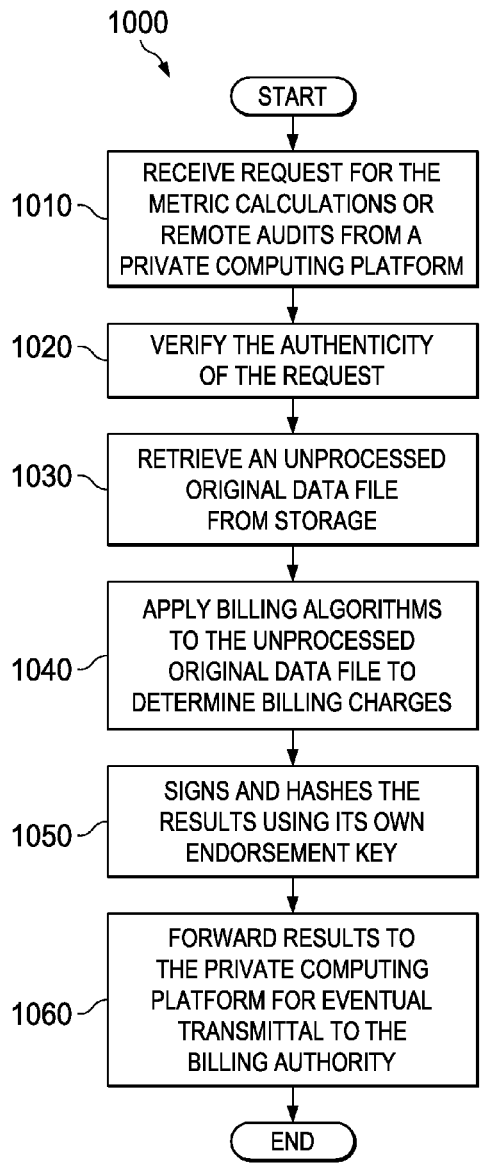
FIG. 10 is a flowchart of a process for performing metric calculations and remote audits according to an illustrative embodiment.

Referring now to FIG. 10, a flowchart of a process for performing metric calculations and remote audits is shown according to an illustrative embodiment. Process 1000 is a software, hardware, or firmware process executing on a billing authority proxy side of an on-board computing device, such as trusted computing module 412 of FIG. 4.

Process 1000 begins by receiving a request for the metric calculations or remote audits from a private computing platform (step 1010). Responsive to receiving the request, process 1000 verifies the authenticity of the request (step 1020). The authenticity of the request is verified through a similar procedure as that shown and described in FIG. 9.

Responsive to verifying the authenticity of the request, process 1000 retrieves an unprocessed original data file from storage (step 1030). The unprocessed original data files can be retrieved from a storage device, such as storage 434 of FIG. 4. In one illustrative embodiment, unprocessed original data files can be retrieved from a third-party storage facility for storage. A user key then allows the unprocessed original data files to be decrypted before further processing. The unprocessed original data files are in a form that is suitable for processing by a proxy for a billing authority, such as trusted computing module 412 of FIG. 4.

Responsive to retrieving the unprocessed original data file, process 1000 applies billing algorithms to the unprocessed original data file to determine billing charges (step 1040). The billing algorithms can be billing algorithms 433 of FIG. 4. The billing algorithms are a hardware or software based logic that transforms global positioning system location information as well as time-based data received from the private computing platform into billing charges.

Responsive to determining the billing charges, process 1000 signs and hashes the results using its own endorsement key (step 1050). The endorsement key is an endorsement key such as endorsement key 422 of FIG. 4. The endorsement key is a unique public-private key pair generated at manufacture and which cannot be changed. The private key of the unique public-private key pair never leaves the trusted computing module. Process 1000 uses the private key to hash and sign the results. The public key is distributed to the billing authority.

Responsive to signing and hashing the results, process 1000 forwards the results to the private computing platform for eventual transmittal to the billing authority (step 1060), with the process terminating thereafter.

Figure 11:
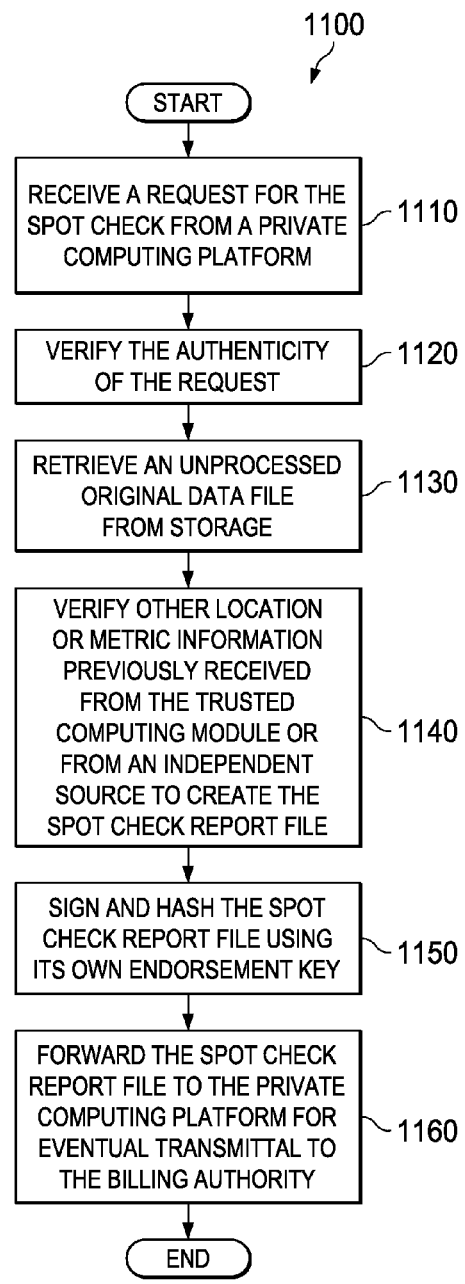
FIG. 11 is a flowchart of a process for performing spot checks according to an illustrative embodiment.

Referring now to FIG. 11, a flowchart of a process for performing spot checks is shown according to an illustrative embodiment. Process 1100 is a software, hardware, or firmware process executing on a billing authority proxy side of an on-board computing device, such as trusted computing module 412 of FIG. 4.

Process 1100 begins by receiving a request for the spot check from a private computing platform (step 1110). Responsive to receiving the request, process 1000 verifies the authenticity of the request (step 1120). The authenticity of the request is verified through a similar procedure as that shown and described in FIG. 9.

Responsive to verifying the authenticity of the request, process 1000 retrieves an unprocessed original data file from storage (step 1130). The unprocessed original data files can be retrieved from a storage device, such as storage 434 of FIG. 4. In one illustrative embodiment, unprocessed original data files can be retrieved from a third-party storage facility for storage. A user key then allows the unprocessed original data files to be decrypted before further processing. The unprocessed original data files are in a form that is suitable for processing by a proxy for a billing authority, such as trusted computing module 412 of FIG. 4.

Process 1100 then compares the spot check with the relevant data of the unprocessed original data files to verify other location or metric information previously received from the trusted computing module, or from an independent source to create the spot check report file (step 1140). The spot check report file contains an indication on whether the trusted computing module is provided with the correct processed original data file. The spot check also contains an indication on whether the data point provided in the request is consistent with the unprocessed original data files. If the data point is not consistent with the original data, then it is possible that the original data is compromised prior to being passed to the trusted computing module for processing. The billing authority timestamps all messages routed to the trusted computing module with a global positioning system time.

Process 1100 signs and hashes the spot check report file using its own endorsement key (step 1150). The endorsement key is an endorsement key such as endorsement key 422 of FIG. 4. The endorsement key is a unique public-private key pair generated at manufacture and which cannot be changed. The private key of the unique public-private key pair never leaves the trusted computing module. Process 1000 uses the private key to hash and sign the results. The public key is distributed to the billing authority.

Responsive to signing and hashing the spot check report file, process 1000 forwards the spot check report file to the private computing platform for eventual transmittal to the billing authority (step 1160), with the process terminating thereafter.

Figure 12:
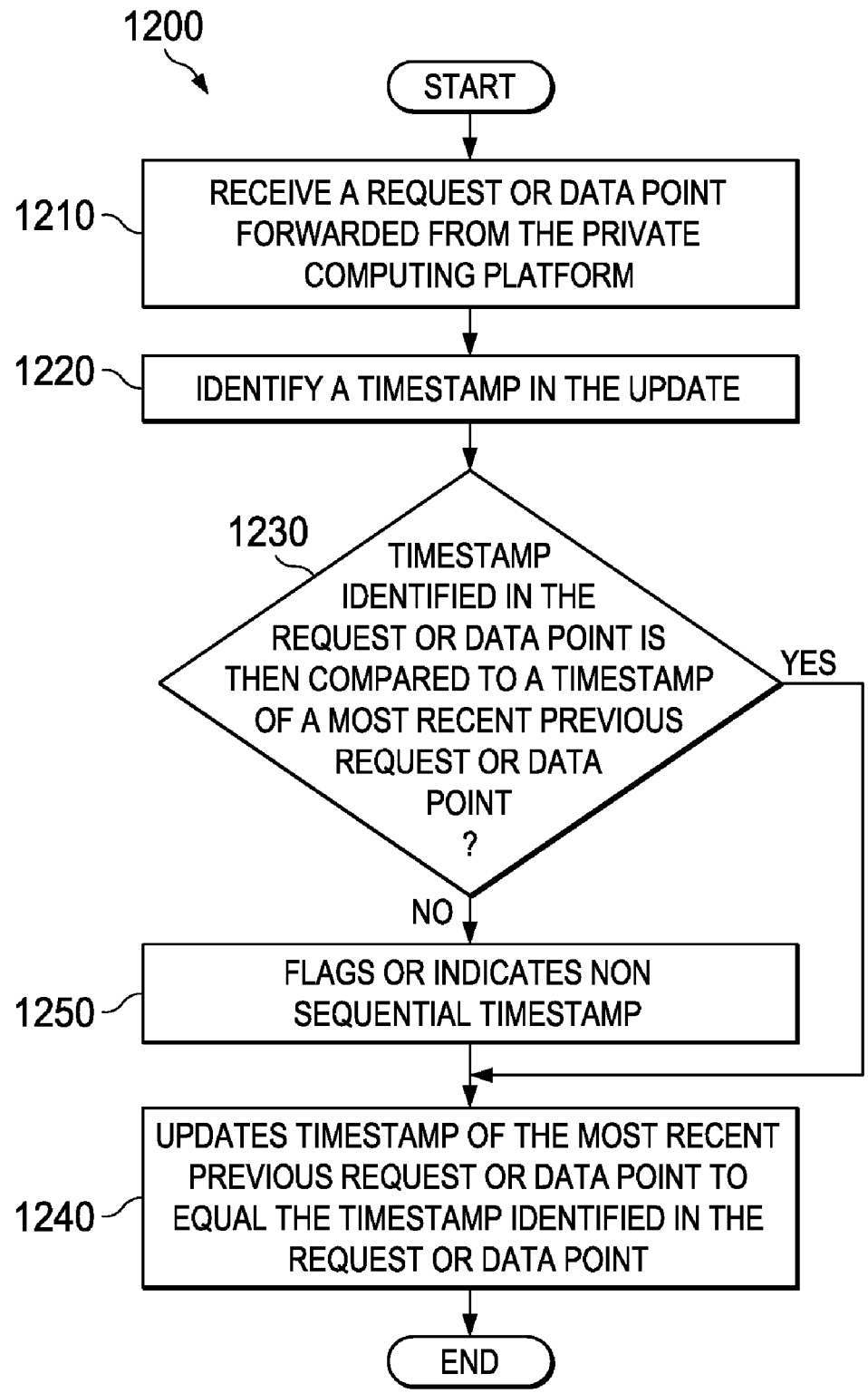
FIG. 12 is a flowchart of a process for maintaining timestamps within a trusted computing module according to an illustrative embodiment.

Referring now to FIG. 12, a flowchart of a process for maintaining timestamps within a trusted computing module is shown according to an illustrative embodiment. Process 1200 is a software, hardware, or firmware process executing on a billing authority proxy side of an on-board computing device, such as trusted computing module 412 of FIG. 4.

Process 1200 begins by receiving a request or data point forwarded from the private computing platform (step 1210). The request or data point can be for example, but not limited to, a spot check request, a metric calculation request, a file authentication, a next data point in a data stream, or a remote audit request.

Responsive to receiving the request or data point, process 1200 identifies a timestamp in the update (step 1220). Data points from a real time information stream and requests from the billing authority are all timestamped. Timestamps of any request from the billing authority is expected to be later in time that the one from the last request received. Also, the timestamp of a data point in a data stream is expected to be later in time that both the timestamp of the last data point received, and the timestamp from the last request received. If either of these conditions are not met, the discrepancy is noted in the next metrics report file and the associated processed original data.

The timestamp identified in the request or data point is then compared to a timestamp of a most recent previous request or data point (step 1230). The timestamp identified in the request or data point should be stamped at a time subsequent to the timestamp of the most recent previous request or data point. If the timestamp identified in the request or data point is subsequent to the timestamp of the most recent previous request or data point ("yes" at step 1230), process 1200 updates the timestamp of the most recent previous request or data point to equal the timestamp identified in the request or data point (step 1240), with the process terminating thereafter.

Returning now to step 1230, if the timestamp identified in the request or data point is not subsequent to the timestamp of the most recent previous request or data point ("no" at step 1230), process 1200 flags or otherwise indicates the non-sequential timestamp (step 1250). The discrepancy can then be noted in a subsequent metric report sent to the billing authority. Process 1200 updates the timestamp of the most recent previous request or data point to equal the timestamp identified in the request or data point (step 1240), with the process terminating thereafter.

Figure 13:
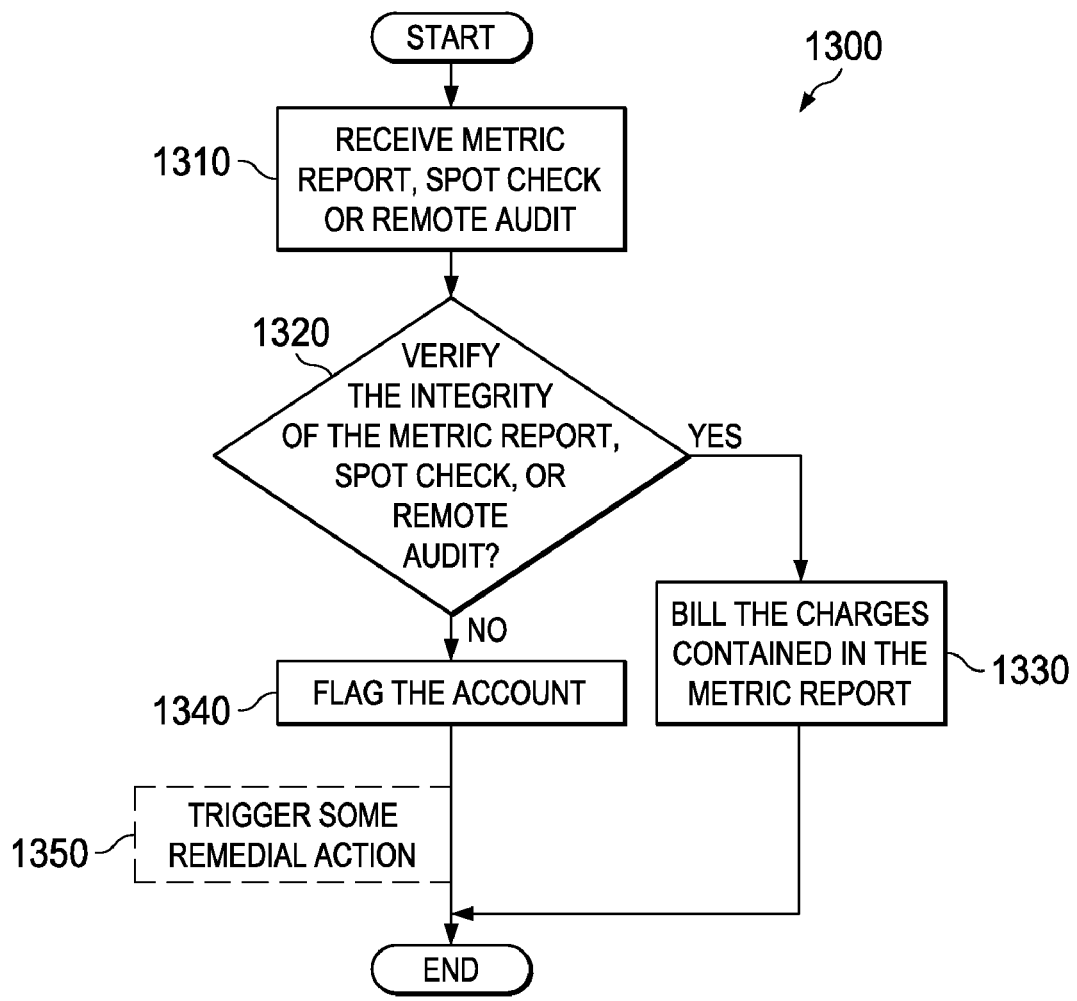
FIG. 13 is a flowchart of a process for receiving metric reports, spot checks, and remote audits and billing users for road usage based thereon in accordance with an illustrative embodiment.

Referring now to FIG. 13, a flowchart of a process for receiving metric reports, spot checks, and remote audits and billing users for road usage based thereon is shown in accordance with an illustrative embodiment. Process 1300 is a software, hardware, or firmware process executing on data processing system, such as billing authority 416 of FIG. 4.

Process 1300 begins by receiving a metric report, spot check, or remote audit from a private computing platform (step 1310). Responsive to receiving the metric report, spot check, or remote audit from the private computing platform, process 1300 verifies the integrity of the metric report, spot check, or remote audit by examining the hash and signature of the metric report (step 1320).

Process 1300 uses a public key, such as public key 440 of FIG. 4 to verify the integrity of the metric report. The public key is distributed to the billing authority from the trusted computing module. The public key is a copy of the public key of a public-private key pair, such as endorsement key 422 of FIG. 4.

Responsive to verifying the integrity of the metric report, spot check, or remote audit ("yes" at step 1320), process 1300 bills the charges contained in the metric report (step 1330). Because the charges have been successfully verified, the billing authority is ensured of the accuracy of the metric report, spot check, or remote audit. The user can then be issued a bill for road usage fees in accordance with the metric report.

Returning now to step 1320, responsive to verifying the integrity of the metric report, spot check, or remote audit ("no" at step 1320), process 1300 flags the account of the user (step 1340). Because the integrity of the metric report, spot check, or remote audit cannot be verified, the billing authority assumes that the metric report, spot check, or remote audit, the unprocessed original data files, the billing algorithms, or some other portion of the on-board device 410 of FIG. 4 has been compromised. The flagged account can trigger some remedial action by the billing authority (step 1350). This remedial action can be, for example, but is not limited to, deactivation of the on-board device.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for determining road usage charges, the method comprising the computer implemented steps of:

retrieving by a private computing platform, an original data file, wherein the private computing platform is located in a client-side on-board computing device, the client-side on-board computing device being partitioned into a trusted computing module, and the private computing platform, wherein the original data file comprises a global positioning system coordinate stream and a time information;

responsive to retrieving the original data file, forwarding by the private computing platform, the original data file to the trusted computing module;

responsive to receiving the original data file, determining a billing charge by applying by the trusted computing module at least one billing algorithm to the original data file;

responsive to determining the billing charge, creating a signed metric report by authenticating by the trusted computing module the billing charge;

forwarding the signed metric report by the trusted computing module to the private computing platform;

forwarding the signed metric report by the private computing platform to a billing authority; and identifying a security breach within the trusted computing module, wherein the security breach comprises a compromise of the data files on the trusted computing module, a compromise of the algorithm on the trusted computing module, or a combination thereof, wherein identifying the security breach comprises the steps of: receiving, by the private computing platform, a remote audit request from the billing authority, wherein the remote audit request includes a known data file having a known metric report result; forwarding the remote audit request by the private computing platform to the trusted computing module; responsive to receiving the remote audit request, creating a second metric report by applying by the trusted computing module the at least one billing algorithm to the remote audit request; responsive to creating the second metric report, creating a second signed metric report by signing and hashing the billing charge by the trusted computing module using a private key of a public-private endorsement key pair; forwarding the second signed metric report by the trusted computing module to the private computing platform; and forwarding the second signed metric report by the private computing platform to the billing authority, wherein the billing authority compares the second signed metric report to the known metric report result to identify a discrepancy between the second signed metric report and the known metric report result.

2. The computer implemented method of claim 1 further comprising:

responsive to receiving the signed metric report by the billing authority, verifying by the billing authority, integrity of the signed metric report received from the private computing platform; and generating a road usage bill by the billing authority based on the signed metric report.

3. The computer implemented method of claim 2, further comprising:

creating the signed metric report by authenticating the signed metric report by signing and hashing the billing charge by the private computing platform using a private key of a public-private endorsement key pair; and verifying by the billing authority, the integrity of the signed data file received from the private computing platform using a public key of the public-private endorsement key pair.

4. The computer implemented method of claim 1, further comprising:

receiving the global positioning system coordinate stream and the time information by the private computing platform from a global positioning system;

formatting the global positioning system coordinate stream and the time information by the private computing platform into an original data file; and storing the original data file.

5. The computer implemented method of claim 4, further comprising:

encrypting the original data file by the private computing platform using a user key, wherein the user key is a public-private key pair;

forwarding the original data file to a third-party storage facility; and storing the original data file at the third-party storage facility.

6. The computer implemented method of claim 1, wherein communications between the private computing platform and the trusted computing module are via an unencrypted serial link.

7. The computer implemented method of claim 1, further comprising performing a spot check verification of original data provided to the billing authority, wherein the spot check verification identifies a compromise of data within the original data file, wherein the spot check verification comprises the steps of:

receiving, by the private computing platform, a spot check request from the billing authority, wherein the spot check request includes a data file requesting verification of location information or metric information previously received by the trusted computing module or from an independent source; forwarding the spot check request by the private computing platform to the trusted computing module; responsive to receiving the spot check request, verifying by the trusted computing module an authenticity of the spot check request; responsive to verifying by the trusted computing module the authenticity of the request, retrieving by the private computing platform and original data file; responsive to retrieving the original data file, creating by the trusted computing module the spot check report file, wherein the spot check report file is created by verifying the location information or the metric information by comparing the spot check request with the original data file; responsive to creating the spot check report file, creating a signed spot check report filed by signing and hashing the spot check report file the by the trusted computing module using a private key of a public-private endorsement key pair; forwarding the signed spot check report file by the trusted computing module to the private computing platform; and forwarding the signed spot check report file by the private computing platform to the billing authority.

8. The computer implemented method of claim 1, further comprising:

receiving, by the a trusted computing module, a request or a data point from the private computing platform via an unencrypted serial link;

identifying, by the trusted computing module, a received timestamp in the request or the data point;

comparing, by the a trusted computing module, to a most recent timestamp of a most recent previous request or data point;

responsive to identifying the received timestamp as not subsequent to the most recent timestamp, indicating the most recent timestamp as a non-sequential timestamp; and updating the most recent timestamp to be the received timestamp.

9. A data processing system comprising:

one or more processors;

a memory storing computer executable instructions that when executed by the one or more processors cause the one or more processors to execute the steps of:

retrieving by a private computing platform an original data file, wherein the private computing platform is located in a client-side on-board computing device, the client-side on-board computing device being partitioned into a trusted computing module, and the private computing platform, wherein the original data file comprises a global positioning system coordinate stream and a time information; responsive to retrieving the original data file, forwarding by the private computing platform the original data file to the trusted computing module; responsive to receiving the original data file, determining a billing charge by applying by the trusted computing module at least one billing algorithm to the original data file; responsive to determining the billing charge, creating a signed metric report by authenticating by the trusted computing module the billing charge to create a signed metric report; forwarding the signed metric report by the trusted computing module to the private computing platform; forwarding the signed metric report by the private computing platform to a billing authority; identifying a security breach within the trusted computing module, wherein the security breach comprises a compromise of the data files on the trusted computing module, a compromise of the algorithm on the trusted computing module, or a combination thereof, wherein identifying the security breach comprises computer executable instructions that when executed by the one or more processors causes the one or more processors to execute the steps of: receiving, by the private computing platform, a remote audit request from the billing authority, wherein the remote audit request includes a known data file having a known metric report result; forwarding the remote audit request by the private computing platform to the trusted computing module; responsive to receiving the remote audit request, creating a second metric report by applying by the trusted computing module the at least one billing algorithm to the remote audit request; responsive to creating the second metric report, creating a second signed metric report by signing and hashing the billing charge by the trusted computing module using a private key of a public-private endorsement key pair; forwarding the second signed metric report by the trusted computing module to the private computing platform; and forwarding the second signed metric report by the private computing platform to the billing authority, wherein the billing authority compares the second signed metric report to the known metric report result to identify a discrepancy between the second signed metric report and the known metric report result.

10. The data processing system of claim 9 wherein the memory storing the computer executable instructions that when executed by the one or more processors causes the one or more processors to further execute the steps of:

creating the signed metric report by authenticating the signed metric report by signing and hashing the billing charge by the private computing platform using a private key of a public-private endorsement key pair.

11. The data processing system of claim 9 wherein the memory storing the computer executable instructions that when executed by the one or more processors causes the one or more processors to further execute the steps of:

receiving the global positioning system coordinate stream and the time information by the private computing platform from a global positioning system; formatting the global positioning system coordinate stream and time information by the private computing platform into the original data file; and storing the original data file.

12. The data processing system of claim 9 wherein the memory storing the computer executable instructions that when executed by the one or more processors causes the one or more processors to further execute the steps of:

encrypting the original data file by the private computing platform using a user key, wherein the user key is a public-private key pair; to forward the original data file to a third party storage facility; and to store the original data file at the third party storage facility.

13. The data processing system of claim 9 wherein the memory storing the computer executable instructions that when executed by the one or more processors causes the one or more processors to further execute the steps of performing a spot check verification of original data provided to the billing authority, wherein the spot check verification identifies a compromise of data within the original data file, wherein the spot check verification comprises computer executable instructions that when executed by the one or more processors causes the one or more processors to further execute the steps of:

receiving, by the a trusted computing module, a spot check request from the billing authority, wherein the spot check request includes a data file requesting verification of location information or metric information previously received by the trusted computing module, or from an independent source; forwarding the spot check request by the trusted computing module to the private computing platform via the unencrypted serial link; responsive to receiving the spot check request, verifying by the private computing platform the authenticity of the request; responsive to verifying by the private computing platform the authenticity of the request, retrieving by the private computing platform the original data file; responsive to retrieving the original data file, creating a spot check report file, wherein the spot check report file is created by comparing the spot check request with the original data file to verify the location information or the metric information; responsive to creating the spot check report file, creating a signed spot check report file by signing and hashing the spot check report file by the private computing platform using a private key of a public-private endorsement key pair; forwarding the signed spot check report file by the private computing platform to the trusted computing module via the unencrypted serial link; and forwarding the signed spot check report file by the trusted computing module to the billing authority.

14. The data processing system of claim 9 wherein the memory storing the computer executable instructions that when executed by the one or more processors causes the one or more processors to further execute the steps of:

receiving, by the a trusted computing module, a request or a data point from the private computing platform via the unencrypted serial link; identifying, by the a trusted computing module, a received timestamp in the request or data point; comparing, by the a trusted computing module, to a most recent timestamp of a most recent previous request or data point; responsive to identifying the received timestamp as not subsequent to the most recent timestamp, indicating the most recent timestamp as a non-sequential time stamp; and updating the most recent timestamp to be the received timestamp.

15. A non-transitory computer readable medium storing computer executable instructions that when executed by one or more processors causes the one or more processors to execute the steps of:

retrieving by a private computing platform an original data file, wherein the private computing platform is located in a client-side on-board computing device, the client-side on-board computing device being partitioned into a trusted computing module, and the private computing platform, wherein the original data file comprises a global positioning system coordinate stream and a time information;

responsive to retrieving the original data file, forwarding by the private computing platform the original data file to the trusted computing module;

responsive to receiving the original data file, determining a billing charge by applying by the trusted computing module at least one billing algorithm to the original data file;

responsive to determining the billing charge, creating a signed metric report by authenticating by the trusted computing module the billing charge;

forwarding the signed metric report by the trusted computing module to the private computing platform; and forwarding the signed metric report by the private computing platform to a billing authority; and identifying a security breach within the trusted computing module, wherein the security breach comprises a compromise of the data files on the trusted computing module, a compromise of the algorithm on the trusted computing module, or a combination thereof, wherein identifying the security breach comprises computer executable instructions that when executed by the one or more processors causes the one or more processors to execute the steps of: receiving, by the private computing platform, a remote audit request from the billing authority, wherein the remote audit request includes a known data file having a known metric report result; forwarding the remote audit request by the private computing platform to the trusted computing module; responsive to receiving the remote audit request, creating a second metric report by applying by the trusted computing module the at least one billing algorithm to the remote audit request responsive to creating the second metric report, creating a second signed metric report by signing and for hashing the billing charge by the trusted computing module using a private key of a public-private endorsement key pair forwarding the second signed metric report by the trusted computing module to the private computing platform; and forwarding the second signed metric report by the private computing platform to the billing authority, wherein the billing authority compares the second signed metric report to the known metric report result to identify a discrepancy between the second signed metric report and the known metric report result.

16. The non-transitory computer readable medium of claim 15, the computer executable instructions that when executed by the one or more processors causes the one or more processors to execute further the steps of:

responsive to receiving the signed metric report by the billing authority, verifying by the billing authority, the integrity of the signed data file received from the private computing platform; and generating a road usage bill by the billing authority based on the signed metric report.

17. The non-transitory computer readable of claim 16, the computer executable instructions that when executed by the one or more processors causes the one or more processors to execute further the steps of:
creating the signed metric report by authenticating the signed metric report by signing and hashing the billing charge by the private computing platform using a private key of a public-private endorsement key pair to create the signed metric report; and
verifying by the billing authority, the integrity of the signed data file received from the private computing platform using a public key of the public-private endorsement key pair.

18. The non-transitory computer readable medium of claim 15, the computer executable instructions that when executed by the one or more processors causes the one or more processors to execute further the steps of:
receiving the global positioning system coordinate stream and the time information by the private computing platform from a global positioning system;
formatting the global positioning system coordinate stream and time information by the private computing platform into the original data file; and
storing the original data file.

19. The non-transitory computer readable medium of claim 18, the computer executable instructions that when executed by the one or more processors causes the one or more processors to execute further the steps of:
encrypting the original data file by the private computing platform using a user key, wherein the user key is a public-private key pair;
forwarding the original data file to a third party storage facility; and
storing the original data file at the third party storage facility.

20. The non-transitory computer readable medium of claim 15, the computer executable instructions that when executed by the one or more processors causes the one or more processors to execute further the steps of performing a spot check verification of original data provided to the billing authority, wherein the spot check verification identifies a compromise of data within the original data file, wherein the spot check verification comprises computer executable instructions that when executed by the one or more processors causes the one or more processors to execute further the steps of:
receiving, by the a trusted computing module, a spot check request from the billing authority, wherein the spot check request includes a data file requesting verification of location information or metric information previously received by the trusted computing module, or from an independent source;
forwarding the spot check request by the trusted computing module to the private computing platform via the unencrypted serial link;
responsive to receiving the spot check request, verifying by the private computing platform the authenticity of the request;
responsive to verifying by the private computing platform the authenticity of the request, retrieving by the private computing platform the original data file;
responsive to retrieving the original data file, creating a spot check report file, wherein the spot check report file is created by comparing the spot check request with the original data file to verify the location information or the metric information;
responsive to creating the spot check report file, creating a signed spot check report file by signing and hashing the spot check report file by the private computing platform using a private key of a public-private endorsement key pair;
forwarding the signed spot check report file by the private computing platform to the trusted computing module via the unencrypted serial link;
forwarding the signed spot check report file by the trusted computing module to the billing authority.

21. The non-transitory computer readable medium of claim 15, the computer executable instructions that when executed by the one or more processors causes the one or more processors to execute further the steps of:
receiving, by the trusted computing module, a request or a data point from the private computing platform via the unencrypted serial link;
identifying, by the a trusted computing module, a received timestamp in the request or data point;
comparing, by the a trusted computing module, to a most recent timestamp of a most recent previous request or data point
responsive to identifying the received timestamp as not subsequent to the most recent timestamp, indicating the most recent timestamp as a non-sequential timestamp; and
updating the most recent timestamp to be the received timestamp.

* * * * *